United States Patent Office 2,771,830
Patented Nov. 27, 1956

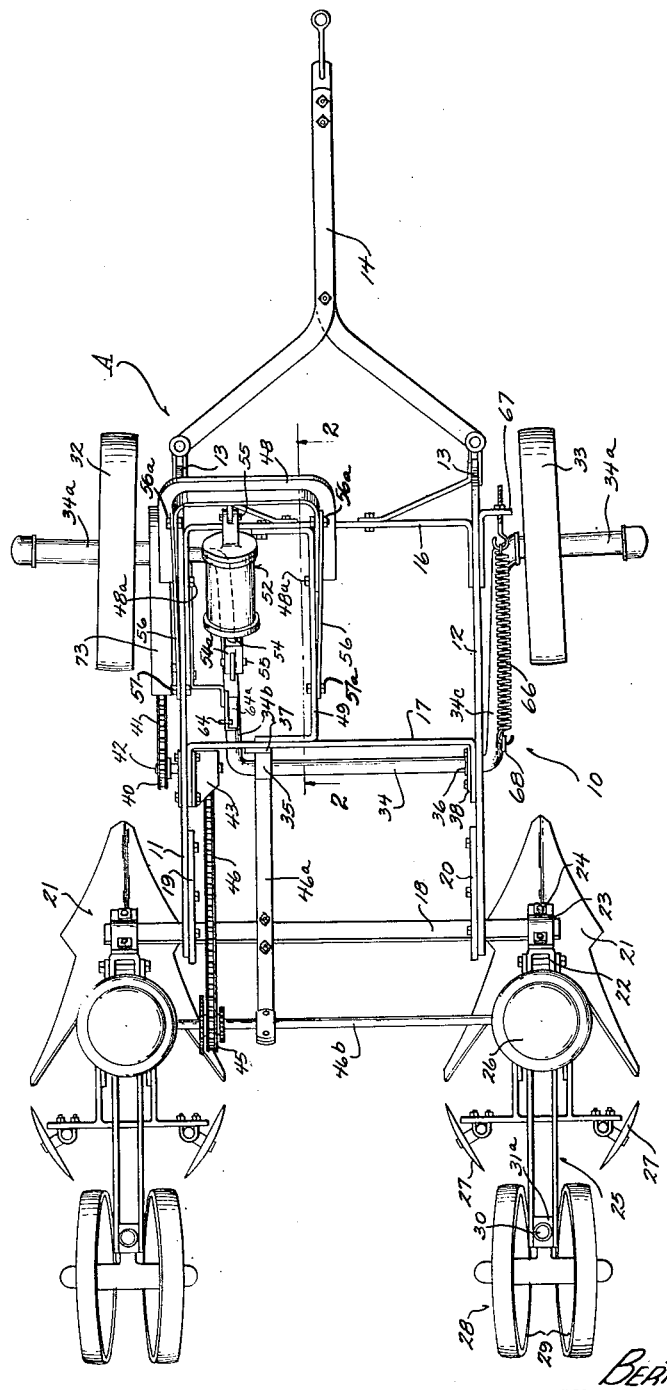

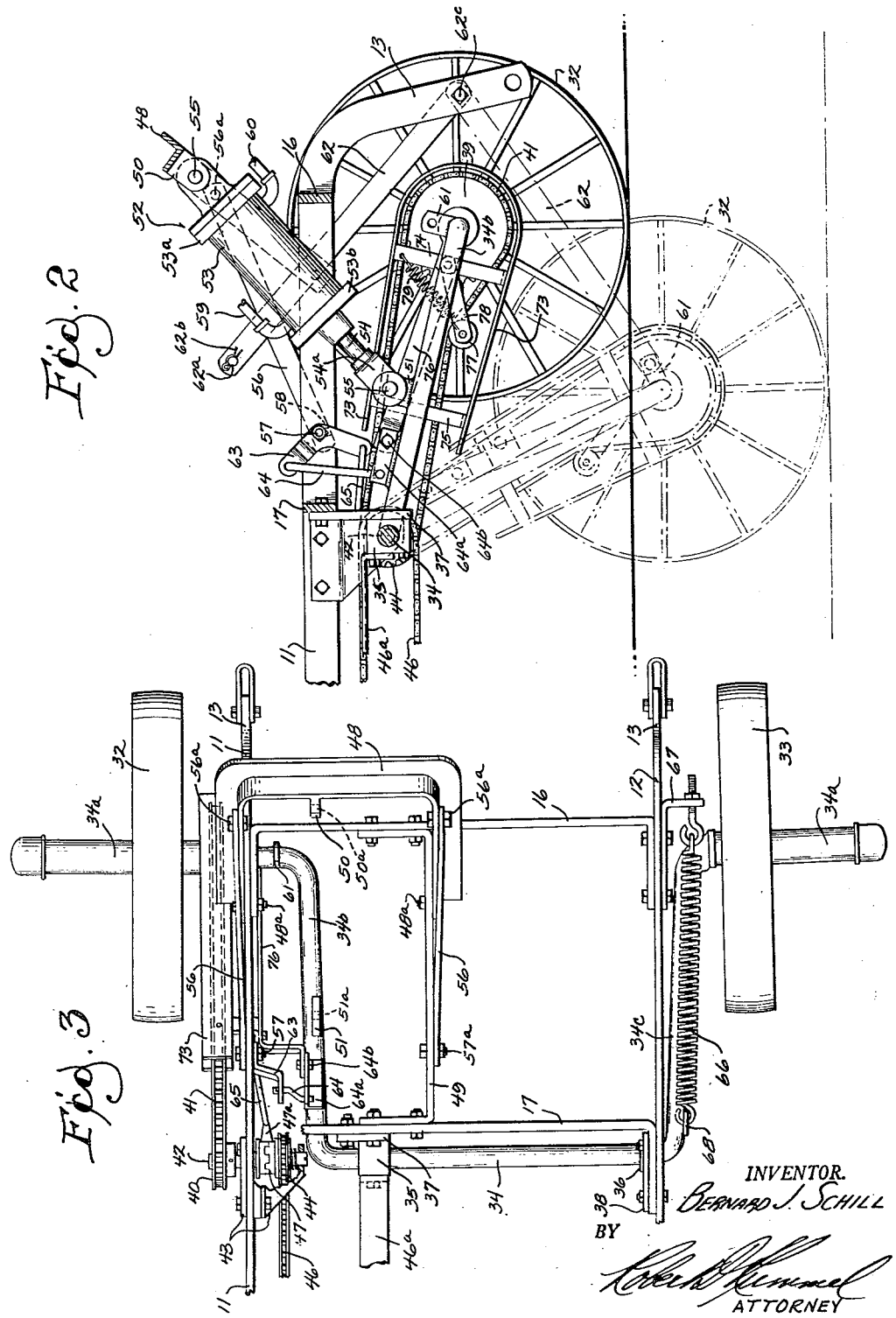

2,771,830
POWER OPERATED LIFT FOR AGRICULTURAL IMPLEMENT

Bernard J. Schill, Rockford, Ill., assignor to J. I. Case Company, Racine, Wis., a corporation of Wisconsin Application August 30, 1951, Serial No. 244,357

4 Claims. (Cl. 97—46.31)

The present invention relates to agricultural implements adapted to be trailed behind a tractor and more particularly to a power operated lifting mechanism carried by said implement for positioning ground working tools in various positions with respect to the ground.

An object of the present invention therefore is to provide an efficient and easily manufactured power operated lift-mechanism for use with agricultural implements.

Another object of the invention is to provide means whereby the implement may be locked in a raised position and the power operated cylinder removed from the implement for use on other implements.

Still a further object of the invention is to provide means whereby the power operated cylinder can be mounted on the implement when the implement is locked in a raised position regardless of whether the cylinder is fully extended, partially extended, or fully retracted.

Still another object of this invention is to provide a power operated lifting means for use with a lister wherein the drive to the seeding mechanism of the lister will be automatically interrupted when the power actuated lifting mechanism assumes a predetermined position.

Further objects and advantages will become apparent from the following specification and drawings of which:

Fig. 1 is a plan view of a lister embodying the present invention.

Fig. 2 is an enlarged cross sectional view taken on the line 2—2 of Fig. 1 with parts removed.

Fig. 3 is a plan view slightly enlarged of certain structure shown in Fig. 1, with parts removed.

The power operated lifting mechanism of the present invention is shown as embodied in a lister A; however, it will be apparent that the principles of the present invention are applicable to other types of implements having ground working tools for moving these tools from a working position to a non-working position. Because so much of the structure and connections disclosed in the lister A are of a conventional nature, no attempt has been made to describe them specifically as it is assumed that the structure and connections will be readily understood from the drawings.

The lister A comprises in the present instance a main frame 10 including substantially parallel fore and aft extending members 11 and 12. The members 11 and 12 are turned downwardly as at 13 for pivotal connection adjacent the ends thereof with a suitable drawbar 14 which in turn has a suitable connection provided at the end thereof for attachment to a tractor or other propelling means, not shown in the drawings. Substantially parallel brace beams 16 and 17 are secured between the members 11 and 12 for maintaining these members in a substantially parallel and rigid relationship. Rearwardly a transverse tool beam 18 of any well known construction is carried adjacent the rearward end of members 11 and 12 by means of brackets 19 and 20, the tool beam 18 being secured as by welding or any other suitable means to the brackets 19 and 20.

For combination with the frame construction just described, there is provided in the present instance a pair of plow units and associated seeding mechanisms in a manner well known in the art. Since these plow units and seeding mechanisms are similar in construction, only one of them will be described. The plow unit includes in the present instance a plow bottom 21 preferably of the type commonly known as a lister bottom, carried by a beam 22 which has secured adjacent its upper end a clamp 23 for selective attachment to the tool beam 18 by means of bolts 24 in a manner well known in the art. The seeding mechanism is carried rearwardly of the tool beam 18 by means of a sub frame 25 which extends rearwardly from the clamp 23 in a substantially fore-and-aft direction, positioning the seeding mechanism directly rearwardly of the plow beam 21. The seeding mechanism in the present instance is of any conventional nature and includes in the present instance the customary seed can 26, and a selecting mechanism, a seed tube, a subsoiler, and a seed spout, all of which are well known in the art, not visible in the drawings, and form no part of the present invention. Coverer discs 27 are provided rearwardly of the seeding mechanism for filling the seed bed or trench formed by the plow 21 after the seed has been deposited therein in a manner well known in the art.

Suitable means 28 are provided rearwardly for movably supporting the sub frame 25 for transport. More specifically means 28 includes a pair of downwardly converging packing wheels 29 provided with a spindle 30 which is journaled in a suitable bearing 31a secured in the sub frame 25 adjacent the rearward extremity thereof. It will be apparent that wheels 29 besides movably supporting the sub frame 25 act so as to pack the earth transversed, thereby tending to set the seeds firmly in the ground by packing the ground adjacent the seed in a manner well known in the art.

Forwardly the main frame 10 is supported for transport by means of aligned wheels 32 and 33. As seen in the drawings, the wheels 32 and 33 are rotatably carried by laterally extending portions 34a of a crank axle 34 which in the present instance is substantially U-shaped. The axle is rotatably secured in bearings 35 and 36 which in turn are respectively carried by brackets 37 and 38 associated with the main frame 10 so as to position the crank axle so as to swing substantially aligned portions 34b and 34c thereof in a substantially forward and downward direction.

For driving the seeding mechanism so that the rate of planting is in direct proportion to the rate of travel of the lister A, a driving sprocket 39 is provided adjacent the wheel 32 so as to rotate therewith and is connected to a sprocket 40, by means of a suitable chain 41. Sprocket 40 is non-rotatably carried by a shaft 42 which is rotatably supported in brackets 43. A sprocket 44 is freely rotatably journaled on the shaft 42 and is operatively connected to a sprocket 45 by means of a suitable chain 46. Sprocket 45 is non-rotatably secured to a driving shaft 46b which is carried by means of a bracket 46a transversely between the seeding mechanisms and operatively connected with the selecting mechanism in a manner well known in the art. For transmitting the motion of sprocket 40 to sprocket 44 a throwout clutch 47 provided with a throwout cam 47a is provided of any well known or suitable construction. A suitable safety shield 73 is provided for the chain 41 and is carried by arched members 74 and 75 which are secured by bolts or the like to a member 76 suitably secured adjacent the portion 34b of the crank axle 34. For maintaining the chain 41 taut, a roller 77 is provided carried by an arm 78 pivotally secured to the member 76 and resiliently urged against the chain 41 by means of a spring 79.

Since in machines of this type, the front wheels 32 and 33 act as gauge wheels for positioning the plow bottoms 21 with respect to the ground, and since the weight of the main frame 10 and its associated parts is sufficient to bias itself downwardly so as to raise the wheels 32 and 33 by swinging the crank axle 34 upwardly, I have provided a hydraulic lifting mechanism for regulating the downward movement of the main frame with respect to the ground and for moving the main frame and consequently the plow bottoms from a working to a non-working position. The lifting mechanism includes in the present instance a saddle, yoke or link 48 pivotally secured by means of bolts 48a—48a for substantially fore-and-aft swinging movement relatively to the member 11 and a substantially parallel member 49 secured between braces 16 and 17. The saddle 48 is provided with an ear 50 which extends toward and is in substantial alignment with an ear 51 formed on the forwardly extending portion 34b of the crank axle 34 adjacent the driving wheel 32. The ears 50 and 51 have formed therein openings or holes 50a—51a respectively. A suitable axially extensible ram or cylinder unit 52 of any well known type generally associated with farm tractors and implements and having a cylindrical body 53 closed at one end by a head 53a and at the other end by a head 53b and a plunger 54 slidable in the cylindrical body 53, and provided with a suitable clevis 54a, is carried between the saddle 48 and the portion 34b of the crank axle 34 and pivotally secured to the ears 50 and 51 by means of suitable pins 55. For rigidly holding the saddle 48 against pivotal movement about the bolts 48a—48a when the ram 52 is secured between the saddle 48 and the crank axle 34 braces 56 are provided pivotally secured forwardly to the opposite sides of the saddle 48 by bolts or the like 56a—56a and are adapted to be swung rearwardly so as to accommodate bolts or other suitable means 57 and 57a secured to frame members 11 and 49 respectively in slots 58 formed adjacent the ends of the respective braces 56. The ram is operatively connected in any usual or suitable manner to the power source of the tractor by means of fluid or pressure connections 59 and 60 opening into the opposite ends of the cylindrical body 53 so that the operator of the tractor by transmitting fluid or pressure into one end of the cylindrical body through one hose and withdrawing the fluid or pressure out of the other end of the cylindrical body by means of the other hose, or vice versa, can retract or expand the ram in a manner well known in the art. It will be apparent from the drawings that when the ram is expanded, the crank axle 34 will be pivoted or forced to swing downwardly so as to raise the frame 10 and consequently plow bottoms 41 when the saddle 48 is locked against swinging by braces 56. When the ram 52 is retracted, the weight of the main frame 10 is sufficient to bias the frame downwardly until it is again restrained by means of the ram 52. When it is desired to transport the machine, the ram 52 must be sufficiently expanded so that the plow bottoms 41 are in a raised position with respect to the ground.

An ear 61 having a hole formed therein is provided on axle 34 adjacent the sprocket 39 and is adapted to receive a stud 62a formed adjacent the free end of a holdup lock 62 which is pivotally secured by a bolt or the like 62c forwardly to the downwardly turned portion 13 of the member 11 so as to be swung into a position wherein the stud 62a can be received by the opening formed in the ear 61 when the lister is positioned for transport. The stud 62a is locked against accidental displacement out of the ear 61 by means of a lock pin or the like 62b when the lister is moved into a transport position.

For interrupting the transmission of motion from the driving wheel 32 to the seeding mechanism 26, when the lister is in a non-working or transporting position, a bell crank 63, pivotally secured with respect to the member 11 by means of the bolt 57 so as to swing in a substantially fore and aft direction, is provided with a link 64 attached to an arm or element 64a which in turn is fixed to the portion 34b by welding, and a link 65 attached to the throwout cam 47a of the clutch 47, element 64a being secured to the member 76 by means of a bolt or the like 64b. It will be apparent that when the ram 52 is expanded sufficiently to move the lister into transport, the link 64 will pull upon the bell crank 63 so as to pull the link 65 forwardly which in turn actuates the throwout cam 47a so as to disengage the clutch 47 and consequently interrupt the transmission of motion from the sprocket 40 to the sprocket 44. When the ram is retracted, the lister is biased downwardly as previously suggested, and when the ram is retracted sufficiently to move the lister into a working position, the link 64 pushes against the bell crank 63 so as to rock the bell crank in the opposite direction which in turn moves the throwout cam 47a rearwardly sufficiently to engage the clutch 47 as well known in the art.

When the lister is locked in transport position by means of hold up lock 62, the ram 52 can be removed by removal of the pins 55 for use with any other implement about the form. It will be noted that when the lister is in a locked position that the ram 52, due to the freely pivotal nature of the saddle 48 when the slotted ends of the braces 56 are free of the bolts 57, can be connected between the saddle and the axle in an extended, retracted, or partially retracted position by merely swinging the saddle until the pins 55 can be inserted for securing the ram in position. Then upon expanding or retracting the ram whatever the case may be the saddle can be swung about the bolts 48a—48a sufficiently to position the braces 56 to be secured by the bolts 57 wherein upon disconnecting the holdout lock 62 from the ear 61, the lister is ready for doing work.

It is to be noted that, while swinging of yoke 48 accommodates the ram 53 in different positions of extension, conversely, extension of the ram tends to cause swinging of the yoke into a position wherein pins 55—55 and bolts 48a lie in a common plane, any other position of the yoke introducing a couple tending to turn the yoke into such a position, which, considering the yoke as a crank, would be in "dead center" relation to the ram, and in practice the length of braces 56 is such that yoke 48 is held in a position approximating that "dead center" relation so as to minimize the stress introduced into braces 56. Actually braces 56 are slightly shorter than necessary to produce a true "dead center" relation, the resulting tendency to turn yoke 48 insuring that braces 56 will always be in slight tension rather than in compression. The braces may thus be of much lighter material than would be required if they had to be stiff enough to also resist compressive forces.

An assisting spring 66 is provided adjacent the member 12 tensioned between an ear 67 secured with the member 12 and an ear 68 secured with crank axle 34 so as to prevent the plow bottoms 21 from striking the ground too severely when the frame 10 is biased downwardly.

It will be appreciated that an exceedingly convenient means has been provided for raising or lowering the lister from a working to a non-working position. Various well known hydraulic controls are contemplated as adaptable for the construction, some of which give accurate control of the position of the plunger within the cylinder 52. With such controls the depth of planting is readily controlled by merely manipulating the hydraulic system so as to hold the piston in the position necessary to maintain the desired planting depth. Other hydraulic systems which operate in such a manner so as to move the plunger to the limit of its travel in one direction or the other are also adaptable for use with the present invention.

I claim:

1. For use with an implement having a supporting frame, and a U-shaped crank axle carried by the frame and swingable in a fore-and-aft direction for raising and lowering said frame, a lifting means including a saddle pivotally secured to said frame above said axle and swingable in a substantially fore-and-aft direction, a pivotal connection on said axle and a pivotal connection on said saddle above said frame in all operative positions of said saddle, said saddle being swingable so as to move said pivotal connection on said saddle varying distances from the pivotal connection on said axle, an axially extensible fluid motor pivotally carried between said pivotal connections and readily detachable therefrom, a slotted brace swingably secured to said saddle and engageable with said frame for preventing swinging movement of said saddle with respect to said frame for causing swinging of said axle for moving said frame into a raised position when said fluid motor is actuated, said saddle being substantially in the same plane with or on dead center with relation to the force of the fluid motor when said frame is in a raised position, and rigid means interconnected between said frame and said axle for locking said axle against swinging movement with respect to said frame when said frame is in raised position for relieving said fluid motor, of the weight of said frame to facilitate removal thereof, said fluid motor being repositioned between said pivotal connections in an extended, partially extended, or contracted condition by swinging of said saddle to adjust the distance between said pivotal connection on said saddle and the pivotal connection on said axle to be substantially equal to the length of said fluid motor.

2. For use with an implement having a supporting frame and an axle including a forwardly and downwardly extending swingable portion for raising and lowering said frame, a lifting means including a saddle pivotally secured to said frame above said swingable portion for swinging in a substantially fore-and-aft direction, a pivotal connection on said swingable portion beneath said saddle and a pivotal connection above said frame on said saddle in all positions thereof, said pivotal connection on said saddle moving varying distances from said pivotal connection on said swingable portion in response to swinging movement of said saddle, a power-responsive axially extensible cylinder unit pivotally carried by said pivotal connections, a brace swingably connected to said saddle and provided with means for engaging said frame for preventing swinging movement of said saddle with respect to said frame when desired for causing swinging of said swingable portion in one direction in response to actuation of said power-responsive cylinder unit, and rigid means pivotally connected to said frame and provided with means for engaging said axle for holding said axle against swinging movement with respect to said frame when said frame is in raised position for permitting removal of said power-responsive cylinder unit without collapse of said implement, said power-responsive cylinder unit being repositioned between said pivotal connections in an extended, partially extended, or contracted condition by swinging said saddle in a fore-and-aft direction so as to provide for the distance between the pivotal connection on said saddle and the pivotal connection on said swingable portion to be substantially equal to the length of said power-responsive cylinder unit, and said brace being of a length to prevent swinging movement of said saddle into complete coincidence with the plane of said cylinder when the latter is extended, whereby said brace will be subjected to tension rather than compressive force when said frame is raised.

3. For use with an implement having a supporting frame and an axle including a forwardly and downwardly extending swingable portion for raising and lowering said frame, a lifting means including a U-shaped saddle pivotally secured to said frame above said swingable portion for swinging in a substantially fore-and-aft direction, a pivotal connection on said swingable portion beneath said U-shaped saddle and a pivotal connection on said saddle, said pivotal connection on said U-shaped saddle moving varying distances from said pivotal connection on said swingable portion in response to swinging movement of said U-shaped saddle, a power-responsive axially extensible cylinder unit pivotally carried by said pivotal connections, a brace swingably connected to said U-shaped saddle and provided with means for engaging said frame for preventing swinging movement of said U-shaped saddle with respect to said frame for causing swinging of said axle in one direction in response to actuation of said power-responsive cylinder unit, said saddle being substantially in the same plane with or on dead center with relation to the force of said cylinder unit when said frame is in a raised position, and rigid means pivotally connected to said frame and provided with means for engaging said axle for holding said axle against swinging movement with respect to said frame when said frame is in a raised position for relieving said power-responsive cylinder unit of the weight of said frame for removal and replacement of said cylinder unit without collapse of said implement, said cylinder unit being repositioned between said pivotal connections in an extended, partially extended, or contracted condition by swinging of said U-shaped saddle in a fore-and-aft direction so as to provide for the distance between the pivotal connection on said saddle and the pivotal connection on said swingable portion to be substantially equal to the length of said cylinder unit.

4. For use with an implement having a supporting frame and an axle including a forwardly and downwardly extending swingable portion for raising and lowering said frame, a lifting means including a U-shaped saddle pivotally secured to said frame above said swingable portion for swinging in a substantially fore-and-aft direction, a pivotal connection on said swingable portion beneath said U-shaped saddle and a pivotal connection on said U-shaped saddle, said pivotal connection on said U-shaped saddle moving varying distances from said pivotal connection on said swingable portion in response to swinging movement of said U-shaped saddle, a power-responsive axially extensible cylinder unit pivotally carried by said pivotal connections, a brace swingably connected to said U-shaped saddle and provided with means for engaging said frame for preventing swinging movement of said U-shaped saddle with respect to said frame for causing swinging of said axle in one direction in response to actuation of said cylinder unit, said saddle being substantially in the plane of or on dead center with relation to the force of said cylinder unit when said frame is in a raised position, and said brace being of a length to position said U-shaped saddle in relation to said cylinder unit such that said cylinder unit will tend at all times to swing said saddle in a direction to tension said brace, and hold up means pivotally connected to said frame and provided with means for engaging said swingable portion of said axle for holding said axle against swinging movement with respect to said frame when said frame is in a transport position for relieving said cylinder of the weight of said frame for removal and replacement of said cylinder without collapse of said implement, said cylinder being repositioned between said pivotal connections in an extended, partially extended, or contracted condition by swinging of said saddle in a fore-and-aft direction so as to adjust the distance between the pivotal connection on said U-shaped saddle and the pivotal connection on said swingable portion substantially equal to the length of said cylinder.

References Cited in the file of this patent

UNITED STATES PATENTS 1,813,207     Silver                 July 7, 1931

(Other references on following page)

UNITED STATES PATENTS

| | | |
|---|---|---|
| 2,031,650 | Hendricks et al. | Feb. 25, 1936 |
| 2,059,205 | Buffington | Nov. 3, 1936 |
| 2,310,602 | Silver | Feb. 9, 1943 |
| 2,323,412 | Noble | July 6, 1943 |
| 2,532,577 | Silver et al. | Dec. 5, 1950 |
| 2,540,100 | Coeur | Feb. 6, 1951 |
| 2,545,111 | Schaubert | Mar. 13, 1951 |
| 2,555,554 | Miller | June 5, 1951 |
| 2,588,918 | Graham | Mar. 11, 1952 |
| 2,625,089 | Pursche | Jan. 13, 1953 |

FOREIGN PATENTS

| | | |
|---|---|---|
| 373,604 | Germany | Apr. 13, 1923 |
| 606,710 | France | Mar. 13, 1926 |
| 758,314 | France | Nov. 3, 1933 |